(12) United States Patent
Yokota et al.

(10) Patent No.: US 12,479,468 B2
(45) Date of Patent: Nov. 25, 2025

(54) VEHICLE CONTROL APPARATUS

(71) Applicant: TOYOTA JIDOSHA KABUSHIKI KAISHA, Toyota (JP)

(72) Inventors: Takahiro Yokota, Susono (JP); Atsushi Kodama, Shizuoka (JP); Hiroki Fukuda, Shizuoka (JP); Taichi Kawanai, Susono (JP); Daichi Hotta, Tokyo (JP); Nobuhide Kamata, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 130 days.

(21) Appl. No.: 18/506,832

(22) Filed: Nov. 10, 2023

(65) Prior Publication Data
US 2024/0157967 A1    May 16, 2024

(30) Foreign Application Priority Data
Nov. 15, 2022    (JP) ................................. 2022-182460

(51) Int. Cl.
*B60W 60/00* (2020.01)
*B60W 10/18* (2012.01)
*B60W 30/02* (2012.01)

(52) U.S. Cl.
CPC .......... *B60W 60/001* (2020.02); *B60W 10/18* (2013.01); *B60W 30/02* (2013.01); *B60W 2552/10* (2020.02); *B60W 2552/15* (2020.02); *B60W 2556/40* (2020.02); *B60W 2710/18* (2013.01); *B60W 2720/10* (2013.01)

(58) Field of Classification Search
None
See application file for complete search history.

(56) References Cited

U.S. PATENT DOCUMENTS

| | | |
|---|---|---|
| 8,255,110 B2 | 8/2012 | Taguchi |
| 8,364,394 B2 | 1/2013 | Taguchi |
| 8,428,812 B2 | 4/2013 | Taguchi |
| 8,660,778 B2 | 2/2014 | Taguchi |
| 9,067,571 B2 | 6/2015 | Matsunaga |
| 9,096,266 B2 | 8/2015 | Irie |

(Continued)

FOREIGN PATENT DOCUMENTS

| | | |
|---|---|---|
| CN | 111319606 A | 6/2020 |
| JP | 2004-185179 A | 7/2004 |

(Continued)

*Primary Examiner* — Jonathan M Dager
(74) *Attorney, Agent, or Firm* — Sughrue Mion, PLLC

(57) ABSTRACT

A vehicle control apparatus for performing autonomous driving of a host vehicle. The vehicle control apparatus includes an operating section information acquisition unit configured to acquire operating section information that is information of an operating section in which vehicle stability control by brake control has been operated in a vehicle in autonomous driving in the past; an operation plan generation unit configured to generate an operation plan of autonomous driving of the host vehicle based on a preset target route and map information; and a vehicle controller configured to perform autonomous driving along the operation plan, wherein the operation plan generation unit generates the operation plan so that the host vehicle does not stop in the operating section.

7 Claims, 6 Drawing Sheets

(56) References Cited

U.S. PATENT DOCUMENTS

| | | | |
|---|---|---|---|
| 9,352,779 B2 | 5/2016 | Kindo et al. | |
| 9,493,145 B2* | 11/2016 | Mehr | B60T 8/172 |
| 9,886,852 B2 | 2/2018 | Urano | |
| 10,048,699 B2 | 8/2018 | Inoue et al. | |
| 10,133,273 B2* | 11/2018 | Linke | G05D 1/0022 |
| 10,486,485 B1* | 11/2019 | Levinson | B60G 17/0162 |
| 10,688,985 B2* | 6/2020 | Yu | G05D 1/0088 |
| 10,850,616 B2* | 12/2020 | Koebler | G01C 21/3841 |
| 10,953,877 B2* | 3/2021 | Chen | B60W 50/0098 |
| 11,022,971 B2* | 6/2021 | Della Penna | G08G 1/0129 |
| 11,110,770 B2* | 9/2021 | Kim | B60G 17/018 |
| 11,230,292 B2* | 1/2022 | Augst | G01C 21/3484 |
| 11,440,542 B2* | 9/2022 | Albrecht | B60W 30/143 |
| 11,454,510 B1* | 9/2022 | Gray | G07C 5/008 |
| 11,486,720 B2* | 11/2022 | Blumentritt | B60W 10/20 |
| 11,546,795 B2* | 1/2023 | Jung | H04W 28/0268 |
| 11,584,361 B2* | 2/2023 | Pan | B60W 50/0098 |
| 11,584,377 B2* | 2/2023 | Cox | B60W 30/0956 |
| 11,628,861 B2* | 4/2023 | Yu | G01C 21/3407 701/26 |
| 11,674,812 B2* | 6/2023 | Omari | G01C 21/3848 701/410 |
| 11,685,373 B2* | 6/2023 | Niemann | B60W 30/12 701/1 |
| 11,816,992 B2* | 11/2023 | Patnaik | G08G 1/207 |
| 11,927,967 B2* | 3/2024 | Jain | G05D 1/0088 |
| 12,100,230 B2* | 9/2024 | Wang | G06V 10/26 |
| 12,159,613 B2* | 12/2024 | Baroghel | G10K 11/1783 |
| 2014/0062725 A1* | 3/2014 | Maston | G08G 1/0141 340/905 |
| 2014/0297116 A1* | 10/2014 | Anderson | B60G 17/019 701/37 |
| 2016/0200317 A1* | 7/2016 | Danzl | B60W 10/04 701/25 |
| 2017/0136842 A1* | 5/2017 | Anderson | B60G 17/016 |
| 2017/0158191 A1* | 6/2017 | Bills | B60W 30/025 |
| 2017/0192434 A1 | 7/2017 | Kou et al. | |
| 2017/0232915 A1* | 8/2017 | Dufford | G01C 21/343 701/48 |
| 2017/0285646 A1* | 10/2017 | Connor | B60W 10/184 |
| 2018/0004211 A1* | 1/2018 | Grimm | G05D 1/0066 |
| 2018/0038705 A1* | 2/2018 | Bills | G01C 21/3484 |
| 2018/0194352 A1* | 7/2018 | Avedisov | G08G 1/163 |
| 2018/0283895 A1* | 10/2018 | Aikin | G01C 21/3415 |
| 2019/0187705 A1* | 6/2019 | Ganguli | G06N 7/01 |
| 2019/0187706 A1* | 6/2019 | Zhou | G06N 3/08 |
| 2019/0217864 A1* | 7/2019 | Kusukame | B60W 60/0016 |
| 2019/0271550 A1* | 9/2019 | Breed | G01C 21/3811 |
| 2019/0294167 A1* | 9/2019 | Kutila | G08G 1/096827 |
| 2019/0301877 A1* | 10/2019 | Duale | G01C 21/3484 |
| 2019/0344783 A1* | 11/2019 | Bertollini | B60W 60/0013 |
| 2020/0079381 A1* | 3/2020 | Lombrozo | B60W 60/0015 |
| 2020/0110817 A1* | 4/2020 | Viswanathan | G06F 16/215 |
| 2020/0191069 A1 | 6/2020 | Naidu et al. | |
| 2020/0255020 A1* | 8/2020 | Simmons | B60W 40/068 |
| 2020/0342760 A1* | 10/2020 | Vassilovski | G05D 1/693 |
| 2020/0348682 A1 | 11/2020 | Kamata | |
| 2021/0048529 A1* | 2/2021 | Roy Chowdhury | B60W 40/068 |
| 2021/0118295 A1* | 4/2021 | Visintainer | G08G 1/096861 |
| 2022/0028277 A1* | 1/2022 | Patnaik | G05D 1/0297 |
| 2022/0119010 A1* | 4/2022 | Beaurepaire | G08G 1/22 |
| 2022/0297697 A1* | 9/2022 | Bhat | B60W 10/20 |
| 2022/0371618 A1* | 11/2022 | Vora | B60W 60/00253 |
| 2023/0166743 A1* | 6/2023 | Heck | G05B 13/027 |
| 2023/0245509 A1* | 8/2023 | Armstrong | G01C 21/3822 701/41 |
| 2023/0373522 A1* | 11/2023 | Duan | H04R 3/005 |
| 2024/0270253 A1* | 8/2024 | Ghannam | B60W 10/20 |
| 2024/0408976 A1* | 12/2024 | Koerber | B60K 6/547 |

FOREIGN PATENT DOCUMENTS

| | | |
|---|---|---|
| JP | 2011-063106 A | 3/2011 |
| JP | WO2016/084981 A | 6/2016 |
| JP | 2021-190038 A | 12/2021 |

* cited by examiner

VEHICLE CONTROL APPARATUS

CROSS-REFERENCE TO RELATED APPLICATIONS

This application is based upon and claims the benefit of priority from Japanese Patent Application No. 2022-182460, filed on Nov. 15, 2022. The entire contents of which are incorporated herein by reference.

TECHNICAL FIELD

The present disclosure relates to a vehicle control apparatus.

BACKGROUND

Japanese Patent Application Laid-Open No. 2011-063106 discloses a vehicle control apparatus. This publication discloses a device that estimates a road surface friction degree of a road based on travel information having a travel record of an own vehicle or another vehicle. The travel information includes longitudinal Gx, lateral Gy, position information, and the like. In this device, the tire generating force is calculated based on the estimated road surface friction degree. This device generates an operation plan under a condition that does not exceed the calculated tire generation force.

SUMMARY

However, the above-described conventional device causes a problem when the vehicle is stopped in a section where the road surface friction degree of the road is low. Specifically, if the actual road surface friction degree is lower than the estimated value when the vehicle is about to start, the vehicle may be stuck.

According to an aspect of the present disclosure, a vehicle control apparatus for performing autonomous driving of a host vehicle. The vehicle control apparatus includes an operating section information acquisition unit configured to acquire operating section information that is information of an operating section in which vehicle stability control by brake control has been operated in a vehicle in autonomous driving in the past; an operation plan generation unit configured to generate an operation plan of autonomous driving of the host vehicle based on a preset target route and map information; and a vehicle controller configured to perform autonomous driving along the operation plan, wherein the operation plan generation unit generates the operation plan so that the host vehicle does not stop in the operating section.

In the vehicle control apparatus, the operation plan generation unit may generate the operation plan such that the host vehicle passes through the operating section at a constant speed.

In the vehicle control apparatus, the operation plan generation unit may generate the operation plan in which the host vehicle passes through the operating section without acceleration or deceleration in the operating section due to acceleration until the host vehicle enters the operating section when the operating section is an uphill slope, and generates the operation plan in which the host vehicle passes through the operating section without acceleration or deceleration in the operating section when the operating section is a downhill slope.

In the vehicle control apparatus, the vehicle controller may stop the host vehicle at a position offset to the left or right in a travelling lane with respect to a center of the travelling lane when the vehicle controller stops the vehicle within the operating section based on an external environment detected by an external sensor of the host vehicle during autonomous driving.

In the vehicle control apparatus, the operating section information may be associated with weather information when the vehicle stability control is activated, and wherein the operation plan generation unit may narrow down the operating section information according to current weather information and uses the narrowed down operating section information to generate the operation plan.

According to an aspect of the present disclosure, since an operation plan can be generated so that a host vehicle does not stop in an operating section in which vehicle stability control by brake control is operated, it is possible to suppress accumulation of vehicle in the operating section.

DETAILED DESCRIPTION

Hereinafter, embodiments of the present disclosure will be described with reference to the drawings.

Figure 1:
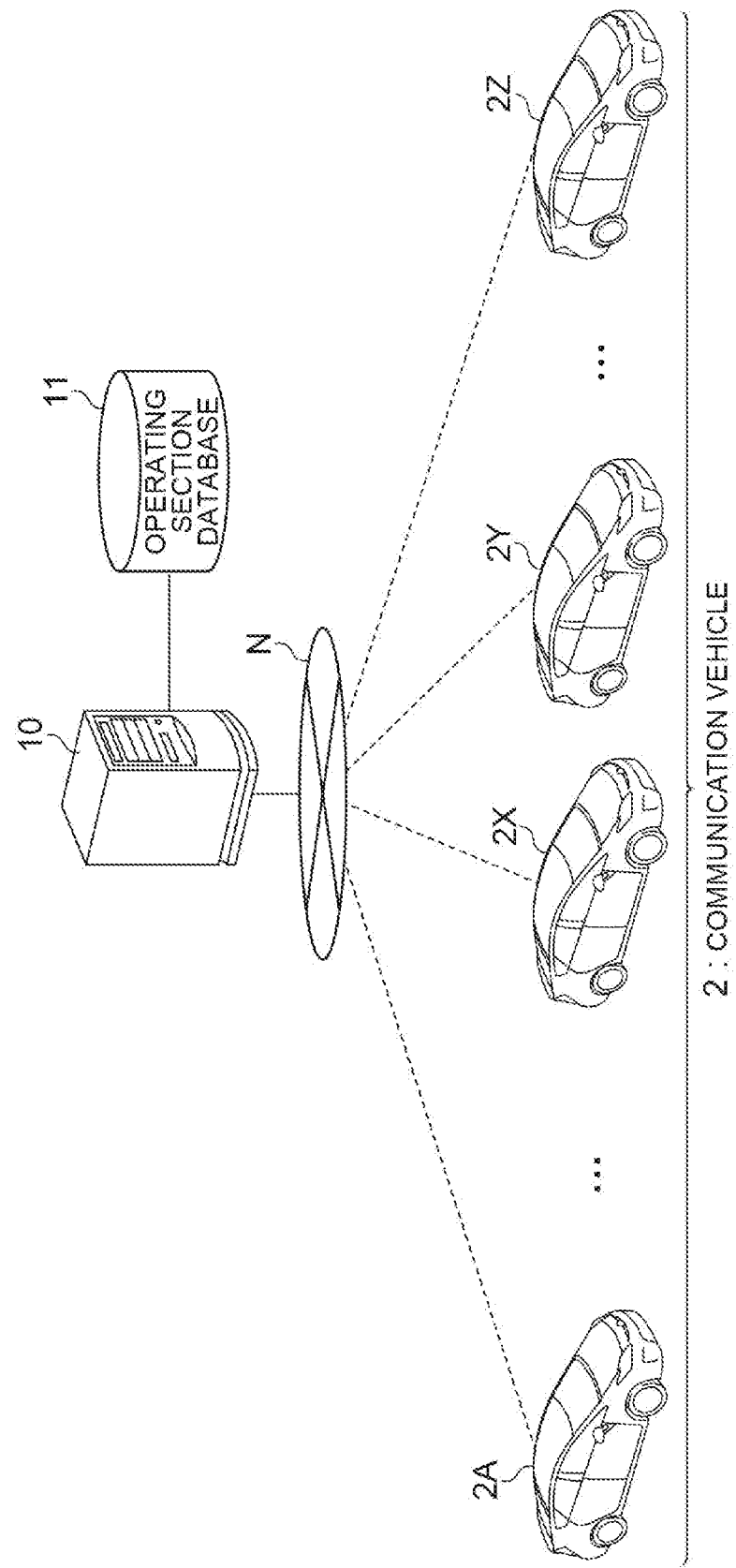
FIG. 1 is a diagram illustrating a vehicle information processing system according to an embodiment.
Figure 2:
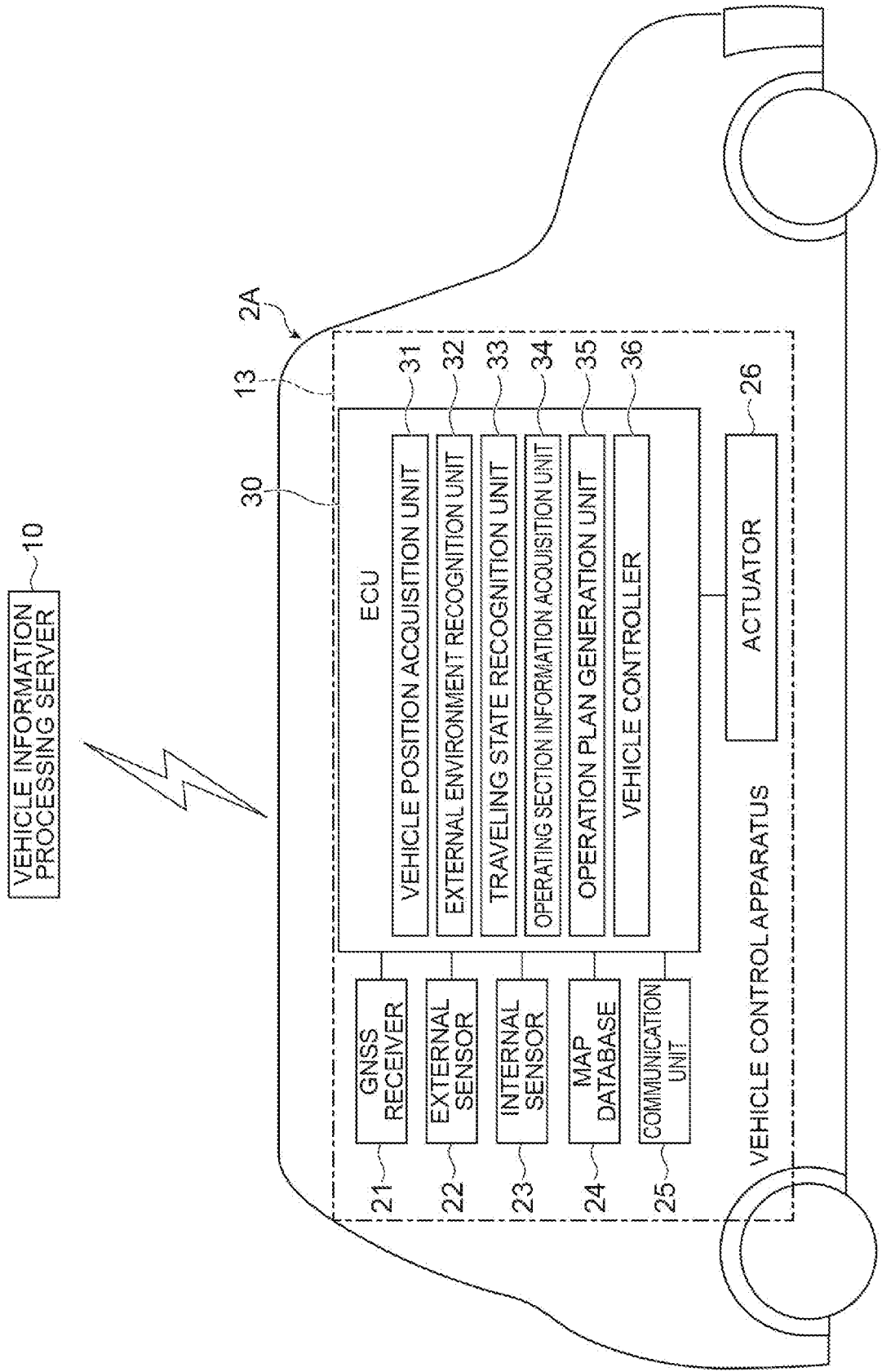
FIG. 2 is a diagram illustrating a vehicle control apparatus of a vehicle information processing system.

FIG. 1 is a diagram illustrating a vehicle information processing system according to an embodiment. Meanwhile, FIG. 2 illustrates a vehicle control apparatus of a vehicle information processing system. As illustrated in FIG. 1 and FIG. 2, the vehicle information processing system includes a vehicle information processing server 10 and an operating section data base 11. Further, a vehicle control apparatus 13 is mounted on a communication vehicle 2.

The vehicle information processing server 10 is configured as a general computer including a processor, a storage unit, a communication unit, a user interface, and the like. The operating section data base 11 is a storage device connected to the vehicle information processing server 10.

The vehicle information processing server 10 is configured to be able to communicate with a plurality of the communication vehicle 2 via wireless communication network N. The communication vehicle 2, for example, includes communication vehicles 2A to 2Z. The wireless communication network N may be the Internet or WIFI. In addition, the wireless communication network N may be a communication network used for mobile phones.

The communication vehicle 2 provides various travel information to the vehicle information processing server 10. The communication vehicle 2 may be a car having an autonomous driving function, or may be a car having no autonomous driving function. The communication vehicle 2 may be an autonomous driving vehicle that travels around a predetermined driving route. The communication vehicle 2 may have an autonomous driving function corresponding to an autonomous driving level 4 of the Society of Automotive Engineers (SAE). The number of the communication vehicle 2 is not particularly limited. The number of the communication vehicle 2 may be one. The communication vehicle 2 does not necessarily need to provide various types of information to the vehicle information processing server 10. The communication vehicle 2 may only obtain information from the vehicle information processing server 10.

The communication vehicle 2 transmits car information including car position information and car speed information to the vehicle information processing server 10. The communication vehicle 2 transmits vehicle stability control operation information related to operation of vehicle stability control by brake control to the vehicle information processing server 10 while autonomous driving is performed. The vehicle stability control operation information includes information on a position and time at which the vehicle stability control is operated. The vehicle stability control operation information may include information on the type of vehicle stability control. The vehicle stability control operation information may include weather information when the vehicle stability control is operated.

The vehicle stability control by brake control includes at least one of the following: VSC [Vehicle Stability Control], TRC [Traction Control], ABS [Anti-lock Braking System].

The vehicle information processing server 10 stores operating section information related to an operating section, which is a section in which the vehicle stability control by the brake control is operated, in the operating section data base 11 based on the operation information of the vehicle stability control by the brake control transmitted from the communication vehicle 2.

The operating section includes a section from a point where the vehicle stability control is started to a point where the vehicle stability control is ended. In detail, the operating section may be a section in which a margin section (for example, 5 m) is added before a point at which the vehicle stability control starts, a section in which a margin section (for example, 5 m) is added after a point at which the vehicle stability control ends, or a section in which margin sections are provided before and after the point.

The operating section data base 11 stores operating section information for a certain period of time (for example, the past one year). The operating section data base 11 may discard operating section information for which a certain period of time has elapsed. The vehicle information processing server 10 transmits the operating section information stored in the operating section data base 11 to the communication vehicle 2 upon request from the communication vehicle 2.

The vehicle control apparatus 13 is mounted on the communication vehicle 2A capable of communicating with the vehicle information processing server 10, and performs autonomous driving in the communication vehicle 2A. Autonomous driving may include autonomous driving level 2 (at least automatic control of vehicle speed), and may be an autonomous driving level 3 or the autonomous driving level 4.

The vehicle control apparatus 13 includes an electronic control unit (ECU30) that integrally manages the device. The ECU30 is an electronic control unit configured to include a central processing unit (CPU) and a storage unit such as a read only memory (ROM) or a random-access memory (RAM). In the ECU30, for example, various functions are realized by executing a program stored in the storage unit by the CPU. The ECU30 may be composed of a plurality of electronic units. In addition, some of the functions of the ECU30 described below may be executed by servers capable of communicating with the communication vehicle 2A. Hereinafter, the communication vehicle 2A is referred to as a host vehicle.

The ECU30 is connected to the GNSS receiver 21, an external sensor 22, an internal sensor 23, a map database 24, a communication unit 25, and an actuator 26.

The GNSS receiver 21 measures the position of the host vehicle (for example, the latitude and longitude of the host vehicle) by receiving signals from positioning satellites. The GNSS receiver 21 transmits the measured position information of the host vehicle to the ECU30.

The external sensor 22 is a detection device that detects a situation around the host vehicle. The external sensor 22 may include at least one of cameras and a radar sensor.

The camera is an imaging device that images an external situation of the host vehicle. The camera is provided on the back side of the windshield of the host vehicle, for example, and captures an image in front of the host vehicle. The camera transmits imaging information about an external situation of the host vehicle to the ECU30. The camera may be a monocular camera, or may be a stereo camera.

The radar sensor is a detection device that detects an object around the host vehicle using radio waves (for example, millimeter waves) or light. The radar sensor includes, for example, a millimeter wave radar or a light detection and ranging (LIDAR). The radar sensor detects an object by transmitting radio waves or light to the surroundings of the host vehicle and receiving radio waves or light reflected by the object. The radar sensor transmits information on the detected object to the ECU30.

The internal sensor 23 is a detection device that detects a traveling state of the host vehicle. The internal sensor 23 includes a vehicle speed sensor, an acceleration sensor, and a yaw rate sensor.

The map database 24 is a data base that stores map information. The map information includes position information of roads. The map information may include gradient information of a road. The map information may include information on an uphill slope and a downhill slope.

The communication unit 25 acquires various types of information via the wireless communication network N. The communication unit 25 exchanges information such as operating section information with the vehicle information processing server 10. The communication unit 25 may acquire weather information corresponding to the current position and driving route of the host vehicle from the servers of the public institution.

The actuator 26 is used to control the host vehicle. The actuator 26 includes a drive actuator, a brake actuator, and a steering actuator. The drive actuator controls the amount of air supplied to the engine (throttle opening) in accordance with a control signal from the ECU30, and controls the driving force of the host vehicle. When the host vehicle is a hybrid electric vehicle (HEV), a control signal from the ECU30 is input to a motor as a power source in addition to the amount of air supplied to the engine, and the driving force is controlled. When the host vehicle is a battery electric vehicle (BEV), a control signal from the ECU30 is input to a motor as a power source, and the driving force is controlled. The motor as a power source in these cases constitutes the actuator 26.

The brake actuator controls a brake system in response to a control signal from the ECU30, and controls a braking force applied to wheels of the host vehicle. As the brake system, for example, a hydraulic brake system can be used. The steering actuator controls driving of an assist motor for controlling steering torque in an electric power steering system according to a control signal from the ECU30. Accordingly, the steering actuator controls the steering torque of the host vehicle.

Next, the functional configuration of the ECU30 will be described. As illustrated in FIG. 2, the ECU30 has a vehicle position acquisition unit 31, an external environment recognition unit 32, a traveling state recognition unit 33, an operating section information acquisition unit 34, an operation plan generation unit 35, and a vehicle controller 36.

The vehicle position acquisition unit 31 recognizes the position of the host vehicle on the map based on the position information of the GNSS reception unit 21 and the map information of the map database 24. Also, the vehicle position acquisition unit 31 may recognize the location of the host vehicle by using location information of a fixed obstacle such as a utility pole included in the map information of the map database 24 and a detection result of the external sensor 22. In this case, the vehicle position acquisition unit 31 is performed by SLAM [Simultaneous Localization and Mapping] A technical position recognition can be performed. In addition, the vehicle position acquisition unit 31 may recognize the position of the host vehicle on the map by a known method.

The external environment recognition unit 32 recognizes an external environment around the host vehicle based on the detection result of the external sensor 22. The external environment includes the position of the obstacle with respect to the host vehicle, the relative speed of the obstacle with respect to the host vehicle, and the movement direction of the obstacle with respect to the host vehicle. The external environment may include a lighting state of traffic light. The external environment may include recognition of a stop line or recognition of a road sign. The external environment may include a road surface friction degree.

The traveling state recognition unit 33 recognizes the traveling state of the host vehicle based on the detection result of the internal sensor 23. The traveling state includes a vehicle speed of the host vehicle, accelerations of the host vehicle, a yaw rate of the host vehicle, and the like.

When the host vehicle is performing autonomous driving, the operating section information acquisition unit 34 acquires operating section information about an operating section on a target route of autonomous driving. The operating section information acquisition unit 34 acquires operating section information by communicating with the vehicle information processing server 10. The target route is obtained from the current position of the host vehicle and the destination of autonomous driving. If the host vehicle is an autonomous driving vehicle at a circular the autonomous driving level 4, the target route is preset as a circular route.

When the host vehicle is performing autonomous driving, the operation plan generation unit 35 generates an operation plan of autonomous driving according to the target route. The operation plan includes at least a vehicle speed plan. The vehicle speed plan includes, for example, a set vehicle speed of the host vehicle corresponding to a position on the target route. A set acceleration may be used in place of the set vehicle speed. The operation plan may include a steering plan. The steering plan includes, for example, a set steering angle or a set lateral position of the host vehicle corresponding to a position on the target route. The set lateral position is a position in the lateral direction with respect to the lane on which the host vehicle travels.

The operation plan generation unit 35 generates an operation plan based on the target route, the map information, and the operating section information so that the host vehicle does not stop in the operating section. Here, the operation plan is generated on the assumption that there is no preceding vehicle that is slower than the host vehicle in an operating section that will be reached in the future.

The operation plan generation unit 35 may generate the operation plan to pass through the operating section at a constant speed. By setting the speed constant, the ground accelerations generated in the actuator 26 of the host vehicle can be brought close to 0, and the risk of slip can be reduced. For example, when the gradient of the operating section is flat, the operation plan generation unit 35 generates the operation plan so as to pass through the operating section at a constant speed. The operation plan generation unit 35 may generate the operation plan to pass through the operating section at a constant speed even when there is a gradient in the operating section.

When the operating section is an uphill, the operation plan generation unit 35 may generate an operation plan in which the host vehicle passes through the operating section without performing acceleration and deceleration in the operating section. An uphill road is a road having an upward gradient equal to or greater than a certain value. "Without acceleration and deceleration" means that acceleration by the driving force of the drive actuator (or engine) of the host vehicle and deceleration by the braking force of the brake actuator are not performed. Acceleration or deceleration due to gravitational acceleration occurs.

The operation plan generation unit 35 generates an operation plan in which the host vehicle passes through the operating section without performing acceleration and deceleration by controlling the vehicle speed to be a vehicle speed that allows the host vehicle to pass through the operating section without acceleration before entering the operating section that is an uphill slope. As the weight of the host vehicle, a total vehicle weight of specifications may be adopted, a value obtained by adding an occupant weight to a vehicle body weight from the number of occupants grasped by a seat belt sensor or an in-vehicle camera may be used, or a value obtained by further adding a weight of a load when the weight of the load can be detected may be used.

When the operating section is a downhill, the operation plan generation unit 35 may generate an operation plan in which the host vehicle passes through the operating section without performing acceleration and deceleration in the operating section. The downhill is a road having a downhill gradient equal to or greater than a certain value. The operation plan generation unit 35 generates an operation plan in which the host vehicle passes through the downhill operating section without performing acceleration and deceleration by controlling the vehicle speed so that the host vehicle passes through the downhill operating section only by acceleration due to inertia and gravity acceleration. In this way, by passing through the operating section without acceleration and deceleration on an uphill or downhill slope, the risk of slip within the operating section can be reduced.

Figure 3:
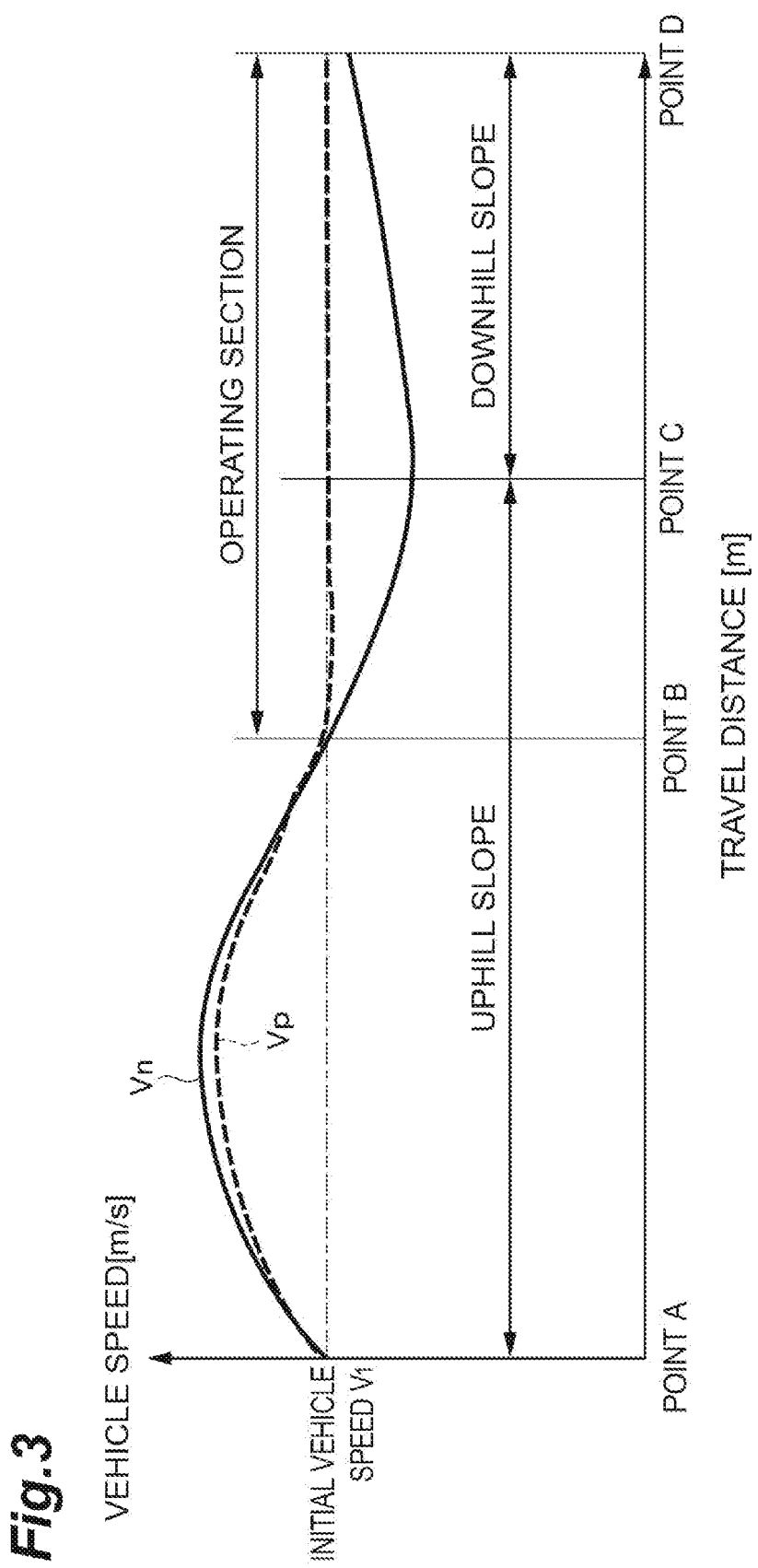
FIG. 3 is a graph illustrating an example of an operation plan including uphill and downhill operating sections.

FIG. 3 is a graph illustrating an example of an operation plan including uphill and downhill operating sections. In FIG. 3, the vertical axis represents the vehicle speed of the host vehicle, and the horizontal axis represents the travel distance. In FIG. 3, an uphill slope extends from point A to point C. Further, a portion from the point C to the point D is a downhill slope. A section from the point B to the point D is set as an operating section. FIG. 3 shows an initial vehicle speed V1, a conventional a vehicle speed plan Vp, and a current a vehicle speed plan Vn.

In the situation illustrated in FIG. 3, the operation plan generation unit 35 generates an operation plan that accelerates well before the activation interval, shown as the vehicle speed plan Vn. As a result, it is possible to climb an uphill road in the operating section without accelerating. Further, an operation plan is generated by not performing deceleration on a downhill slope after the point C, allowing the vehicle to accelerate due to gravitational acceleration. As a result, the vehicle speed plan Vn generated by the operation plan generation unit 35 can bring the ground accelerations generated in the actuator 26 of the host vehicle within the operating section closer to 0 compared to the conventional the vehicle speed plan Vp in which the acceleration by the driving force and the deceleration by the braking force are maintained at constant speeds within the operating section. As a result, the risk of slippage can be reduced.

The operation plan generation unit 35 can be narrowed down to operating section information according to current weather information and used to generate an operation plan. In this case, the operating section information is stored in association with weather information when the vehicle stability control is activated in the operating section data base 11. If the current weather information indicates snow, for example, the operation plan generation unit 35 may use only the operating section information associated with the snowy weather information to generate the operation plan. Also, if the current weather information is rain, only the operating section information associated with the rain weather information may be used to generate the operation plan. Further, the operation plan generation unit 35 can narrow down the operating section information for each operating section by using the current weather information of the region where the operating section is located.

The operation plan generation unit 35 may consider outside air temperature information and moisture information in the weather information. In the operation plan generation unit 35, only operating section information in which the weather around the current host vehicle is the same, the outside air temperature is within ±10 degrees, and the moisture is within ±10% may be used to generate the operation plan.

The operation plan generation unit 35 may modify the operation plan during autonomous driving so that the host vehicle does not stop in the operating section. When the operation plan generation unit 35 acquires the information of the switching cycle of the lighting state of the traffic light in the operating section, the operation plan may be modified so that the host vehicle passes at the timing when the traffic light in the operating section is a green signal (lighting state of passing permission).

When the next operating section is an uphill and a preceding vehicle is present before the host vehicle, the operation plan generation unit 35 may modify the operation plan to secure a sufficient inter-vehicle distance between the preceding vehicle and the host vehicle for pre-acceleration before entering the operating section. Similarly, when the next operating section is a downhill and a preceding vehicle is present in front of the host vehicle, the operation plan generation unit 35 may modify the operation plan to sufficiently secure the inter-vehicle distances between the preceding vehicle and the host vehicle so as not to catch up with the preceding vehicle due to acceleration caused by gravity acceleration on the downhill.

The operation plan generation unit 35 determines whether it is necessary to stop the host vehicle in the operating section during autonomous driving based on the external environment recognized by the external environment recognition unit 32. The operation plan generation unit 35 determines that it is necessary to stop the host vehicle, for example, in a case where traffic light in an operating section in front of the host vehicle becomes a red light (a lighting state in which passage is prohibited). When the preceding vehicle stops in the operating section, the operation plan generation unit 35 determines that the host vehicle needs to stop.

Figure 4:
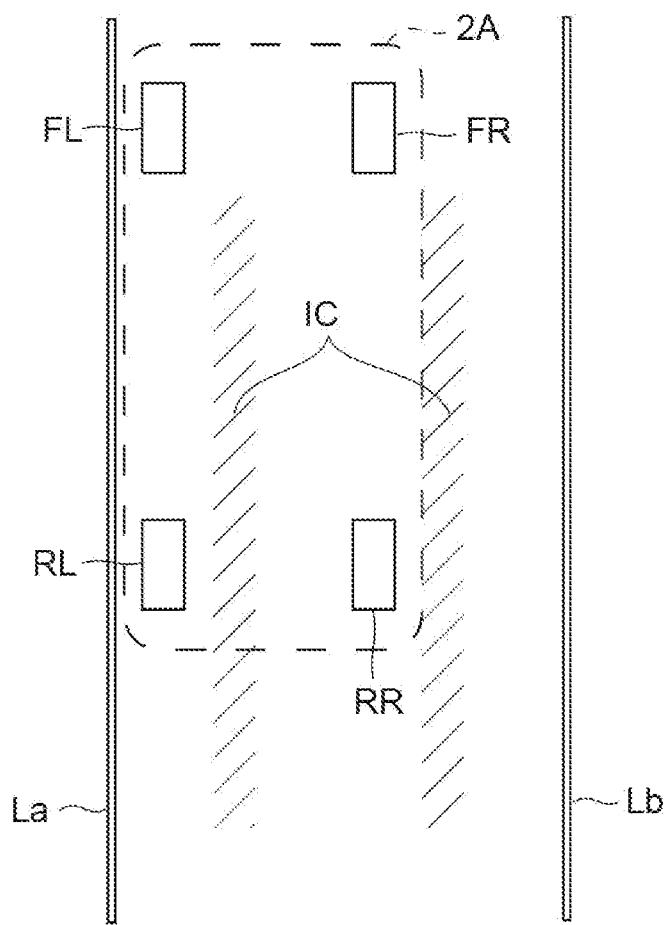
FIG. 4 is a plan view illustrating an example of a stop position in an operating section.

When the operation plan generation unit 35 determines that it is necessary to stop the host vehicle during autonomous driving in the operating section, the operation plan is generated so that the host vehicle stops at a position offset to the left or right in the travelling lane with respect to the center of the travelling lane of the host vehicle. FIG. 4 is a plan view illustrating an example of a stop position in an operating section. FIG. 4 shows a lane line La and a lane line Lb of travelling lane, an iced burn IC, a host vehicle 2A, a tire FR of the host vehicle 2A, FL, RR, RL.

The iced burn IC is a place on the snowy road where the snow has become compacted and slippery due to stopping of other vehicles. The iced burn IC is likely to form in ruts along the center of the lane where vehicles frequently stop. For this reason, as illustrated in FIG. 4, the operation plan generation unit 35 stops at a position offset to the left from the center of the travelling lane, and thus it is possible to suppress the occurrence of the stack due to the influence of the iced burn IC at the time of starting. When the vehicle stops so that at least one of the left and right tires deviates from the iced burn IC, the probability that the vehicle can start without being stuck by the TRC increases.

The offset amount can be set in advance based on the tread of a general vehicle. The offset amount is, for example, 30 cm. Even when there is no snowfall, a part of the road may be shaved along the tire to form a puddle at a position where the vehicle frequently stops. It is also desirable to avoid puddles because they can cause vehicles to get stuck.

When the position in the front-rear direction where the vehicle frequently stops is determined due to a stop line or the like, the stop position can be offset in the front-rear direction. As a result, the influence of iced burn or puddle on the rear wheel can be suppressed. The offset amount in the front-rear direction can be set in advance based on a wheel base of a general vehicle. For example, the offset amount is 30 cm. Each offset amount may be determined in consideration of a tread, a wheel base, and a driving form of the host vehicle. In particular, when the host vehicle is rear-wheel-driven, it is desirable to stop the vehicle so that the rear wheels are removed from the iced burn or puddle.

When the road surface friction degree is recognized by image recognition of the external environment recognition unit 32 or the like, the operation plan generation unit 35 may correct the operation plan such that the host vehicle stops while avoiding a place where the road surface friction degree is less than a predetermined value in the operating section. In addition, the operation plan generation unit 35 may acquire information on the road surface friction degree in the operating section from the preceding vehicle through inter-vehicle communication.

The vehicle controller 36 performs autonomous driving of the host vehicle according to the operation plan generated by the operation plan generation unit 35. The vehicle controller 36 executes autonomous driving of the host vehicle so as not to stop in the operating section based on the operation plan while referring to the external environment of the host vehicle and the traveling state of the host vehicle. When the host vehicle needs to stop in the operating section, the vehicle controller 36 stops at a position offset in the left-right direction or the front-rear direction from the position where the host vehicle normally stops based on the operation plan.

Figure 5:
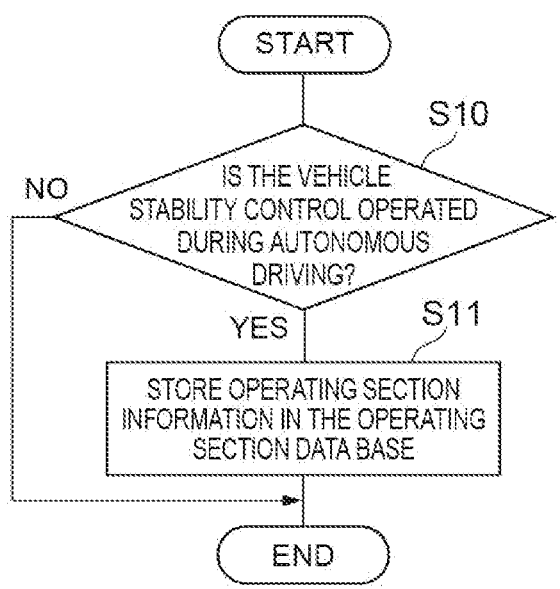
FIG. 5 is a flowchart showing an example of an operating section information storage process in the vehicle information processing system.

Subsequently, an operating section information storage process of the vehicle information processing system according to the present embodiment will be described with reference to FIG. 5. FIG. 5 is a flowchart showing an example of an operating section information storage process in the vehicle information processing system.

As illustrated in FIG. 5, the vehicle information processing server 10 of the vehicle information processing system determines whether the vehicle stability control by the brake control is operated during autonomous driving of the communication vehicle 2 as S10. When it is determined that the vehicle stability control is activated during autonomous driving (S10: YES), the vehicle information processing server 10 transitions to S11. When the vehicle information processing server 10 does not determine that the vehicle stability control is activated during autonomous driving (S10: NO), the current operating section information storage processing is ended.

In the S11, the vehicle information processing server 10 stores operating section information on an operating section, which is a section in which vehicle stability control by brake control is operated, in the operating section data base 11. Thereafter, the vehicle information processing server 10 ends the current operating section information storage processing.

Figure 6A:
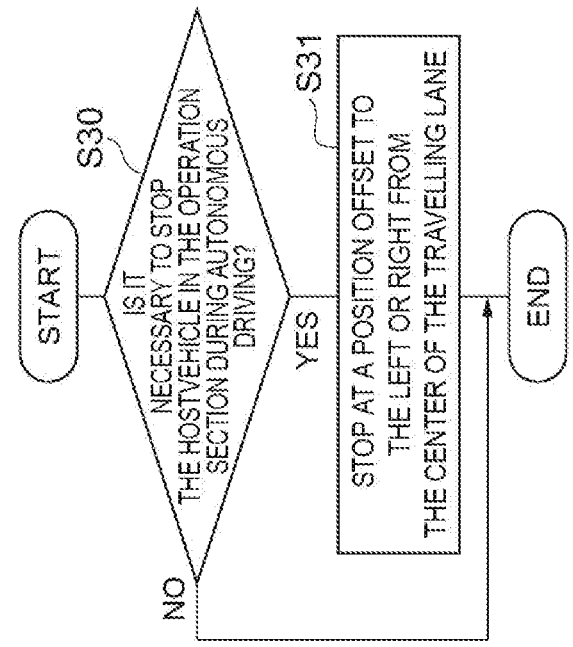
FIG. 6A is a flowchart illustrating an example of operation plan generation processing in the vehicle control apparatus.

Next, the vehicle control apparatus 13 processing according to the present embodiment will be described with reference to FIG. 6A and FIG. 6B. FIG. 6A is a flowchart illustrating an example of operation plan generation processing in the vehicle control apparatus. The operation plan generation process is executed when the host vehicle performs autonomous driving.

As illustrated in FIG. 6A, for the ECU30 of the vehicle control apparatus 13, the target route is set as S20. The target route is determined from, for example, the current position of the host vehicle and the set destination. The target route is determined from, for example, the current position of the host vehicle and the set destination. When the host vehicle is a cyclic autonomous driving vehicle, the target route setting process is not necessary.

In S21, the ECU30 acquires operating section information about an operating section on the target route of autonomous driving through the operating section information acquisition unit 34. The operating section information acquisition unit 34 obtains operating section information from the operating section data base 11 of the vehicle information processing server 10 vi the communication unit 25. The operating section information acquisition unit 34 may narrow down the operating section information to be acquired using the current weather information.

In S22, the ECU30 generates an operation plan so that the host vehicle does not stop in the operating section by the operation plan generation unit 35. The operation plan generation unit 35 may generate the operation plan to pass through the operating section at a constant speed. The operation plan generation unit 35 may generate an operation plan in which the host vehicle passes through the operating section without performing acceleration and deceleration in the operating section when the operating section is an upward slope or a descending slope.

Figure 6B:
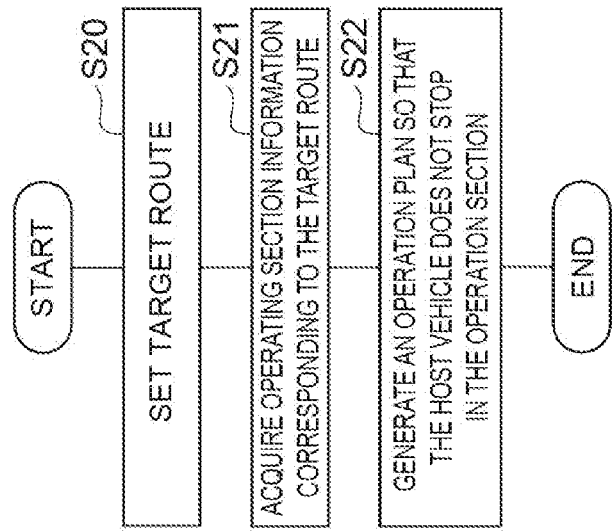
FIG. 6B is a flowchart illustrating an example of the stop control process in the vehicle control apparatus.

FIG. 6B is a flowchart illustrating an example of the stop control process in the vehicle control apparatus. The vehicle stop control process is performed during execution of autonomous driving. The stop control process may be executed when the host vehicle approaches within a certain distance from the operating section. The vehicle stop control process may also be executed during autonomous driving in the operating section.

As illustrated in FIG. 6B, as S30, the ECU30 determines whether it is necessary to stop the host vehicle in the operating section during autonomous driving by the operation plan generation unit 35. The operation plan generation unit 35 determines that it is necessary to stop the host vehicle, for example, in a case where traffic light in an operating section in front of the host vehicle becomes a red light (a lighting state in which passage is prohibited). If it is determined that the host vehicle needs to be stopped in the operating section (S30: YES), the ECU30 transitions to S31. If it is not determined that the host vehicle needs to be stopped within the operating section (S30: NO), S30 ends the current stop control process. Thereafter, the ECU30 executes the stop control process at regular time intervals while the autonomous driving is continued.

In S31, ECU30 generates an operation plan so that the host vehicle stops at a position offset to the left or right from the center of the travelling lane due to the operation plan generation unit 35. The operation plan may be generated so that the operation plan generation unit 35 stops at a position offset in the front-rear direction with respect to the stopping position of the stop line.

According to the vehicle control apparatus 13 according to the present embodiment described above, it is possible to generate the operation plan so that the host vehicle does not stop in the operating section in which the vehicle stability control by the brake control is operated in the host vehicle or another the communication vehicle 2. As a result, it is possible to suppress the accumulation of the host vehicle in the operating section. In addition, in the vehicle control apparatus 13, it is possible to avoid unnecessary restrictions on the operation plan by accurately narrowing down the operating section in consideration of the weather information.

Further, according to the vehicle control apparatus 13, it is possible to generate an operation plan so that a host vehicle passes through an operating section at a constant speed. As a result, the ground accelerations generated in the actuator 26 of the host vehicle can be brought close to 0, and the risk of slip can be reduced. Further, according to the vehicle control apparatus 13, the risk of slip in the operating section can be reduced by generating the operation plan in which the host vehicle passes through the operating section without performing acceleration and deceleration in the operating section when the operating section is an upward slope or a descending slope.

Although embodiments of the present disclosure have been described above, the present disclosure is not limited to the above-described embodiments. The present disclosure can be implemented in various forms in which various changes and modifications are made based on the knowledge of those skilled in the art, including the above-described embodiments.

For example, it is not necessary to construct a vehicle information processing system in which the vehicle control apparatus 13 includes the vehicle information processing server 10. The vehicle control apparatus 13 may target only an operating section that is a section in which the host vehicle has operated vehicle stability control by brake control in the past. The vehicle control apparatus 13 generates an operation plan so that the host vehicle does not stop in an operating section in which the host vehicle has operated the vehicle stability control in the past. In this case, the operating section data base 11 is mounted on the host vehicle.

What is claimed is:

1. A vehicle control apparatus for performing autonomous driving of a host vehicle, the vehicle control apparatus comprising:
at least one electronic control unit, which includes a processor and a memory that stores a program to be executed by the processor, configured to:
acquire operating section information which is information of an operating section in which vehicle stability control by brake control is operated in a vehicle during autonomous driving in the past; and
generate an operation plan of autonomous driving of the host vehicle based on a preset target route, map information, and the operating section information;
perform the autonomous driving according to the operation plan; and
wherein the at least one electronic control unit is configured to:
generate the operation plan so that the host vehicle does not stop in the operating section on the target route,
generate the operation plan in which the host vehicle passes through the operating section without acceleration or deceleration in the operating section due to acceleration until the host vehicle enters the operating section when the operating section is an uphill slope, and
generate the operation plan in which the host vehicle passes through the operating section without acceleration or deceleration in the operating section when the operating section is a downhill slope.

2. The vehicle control apparatus according to claim 1, wherein the at least one electronic control unit is further configured to generate the operation plan such that the host vehicle passes through the operating section at a constant speed.

3. The vehicle control apparatus according to claim 2, wherein the at least one electronic control unit is further configured to
stop the host vehicle at a position offset to the left or right in a travelling lane with respect to a center of the travelling lane when the host vehicle is stopped within the operating section based on an external environment detected by an external sensor of the host vehicle during autonomous driving.

4. The vehicle control apparatus according to claim 1, wherein the at least one electronic control unit is further configured to stop the host vehicle at a position offset to the left or right in a travelling lane with respect to a center of the travelling lane when the vehicle is stopped within the operating section based on an external environment detected by an external sensor of the host vehicle during autonomous driving.

5. The vehicle control apparatus according to claim 2, wherein the operating section information is associated with weather information when the vehicle stability control is activated, and wherein the at least one electronic control unit is further configured to narrow down the operating section information according to current weather information and uses the narrowed down operating section information to generate the operation plan.

6. The vehicle control apparatus according to claim 1, wherein the operating section information is associated with weather information when the vehicle stability control is activated, and wherein the at least one electronic control unit narrows down the operating section information according to current weather information and uses the narrowed down operating section information to generate the operation plan.

7. A vehicle control apparatus according for performing autonomous driving of a host vehicle, the vehicle control apparatus comprising:
at least one electronic control unit, which includes a processor and a memory that stores a program to be executed by the processor, configured to:
acquire operating section information which is information of an operating section in which vehicle stability control by brake control is operated in a vehicle during autonomous driving in the past; and
generate an operation plan of autonomous driving of the host vehicle based on a preset target route, map information, and the operating section information; and
perform the autonomous driving according to the operation plan,
wherein the at least one electronic control unit is further configured to stop the host vehicle at a position offset to the left or right in a travelling lane with respect to a center of the travelling lane when the host vehicle is stopped within the operating section based on an external environment detected by an external sensor of the host vehicle during autonomous driving.

* * * * *